US009693355B2

(12) United States Patent
Ouyang et al.

(10) Patent No.: US 9,693,355 B2
(45) Date of Patent: Jun. 27, 2017

(54) METHODS AND SYSTEMS FOR PROFILING NETWORK RESOURCE USAGE BY A MOBILE APPLICATION

(71) Applicant: Verizon Patent and Licensing Inc., Arlington, VA (US)

(72) Inventors: Ye Ouyang, Piscataway, NJ (US); Carol Becht, Boonton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 57 days.

(21) Appl. No.: 14/805,361

(22) Filed: Jul. 21, 2015

(65) Prior Publication Data

US 2017/0026949 A1   Jan. 26, 2017

(51) Int. Cl.
*H04W 72/04* (2009.01)
*H04W 24/08* (2009.01)
*H04W 24/10* (2009.01)

(52) U.S. Cl.
CPC ......... *H04W 72/048* (2013.01); *H04W 24/08* (2013.01); *H04W 24/10* (2013.01)

(58) Field of Classification Search
CPC ...... H04B 3/46; H04B 10/07; H04B 10/0775; H04B 10/0795; H04B 17/00; H04B 17/101; H04B 17/15; H04B 17/29; H04B 17/391; H04L 43/00; H04L 43/08; H04L 12/26; H04L 43/50; H04L 41/14; H04L 41/145; H04L 41/5038; H04W 4/26; H04W 16/22; H04W 24/06
See application file for complete search history.

(56) References Cited

U.S. PATENT DOCUMENTS

| 2015/0007303 A1* | 1/2015 | Hayes | H04L 67/22 726/12 |
| 2015/0044187 A1* | 2/2015 | Visel | C12N 15/85 424/93.7 |
| 2015/0072641 A1* | 3/2015 | Raleigh | G06Q 30/016 455/406 |
| 2015/0289146 A1* | 10/2015 | Ouyang | H04W 16/22 370/252 |

OTHER PUBLICATIONS

"Network Traffic Clustering Using Random Forest Proximities"; Wang et al., IEEE ICC 2013—Communication and Information Systems Security Symposium.*

* cited by examiner

*Primary Examiner* — Benjamin H Elliott, IV

(57) ABSTRACT

An exemplary profiling system builds a two-layer mapping model for a mobile network. The two-layer mapping model establishes a causal relationship between a plurality of application behavior indicators and network resource usage within the mobile network by defining a first mapping relationship between the plurality of application behavior indicators and a plurality of network performance indicators representative of network traffic that passes through the mobile network, and a second mapping relationship between the plurality of network performance indicators and network resource usage within the mobile network. Corresponding systems and methods are also described.

19 Claims, 6 Drawing Sheets

Input: Training data with pre-selected $n$ indicators
Trained decision trees with $T$ nodes
A n-by-n all zero matrix $P$
Output: Importance score $IS_i$ of each indicator $f_i$
// *Update P*
1: for $i = 1 : T$ do
2:    Obtain $FeatureSet$ in $TreeNode_i$
3:    for each indicator pair $f_j$ and $f_k$ in $FeatureSet$ do
4:       $P_{j,k} = P_{j,k} + 1$
5:    end for
6: end for
7: Normalize $P$
8: Compute similarity ratio $R$ based on $P$ using $R = \frac{P_{intra}}{P_{inter}}$
9: for $i = 1 : n$ do
10:    Replace $f_i$ with noise
11:    Compute similarity ratio $R_i$
12:    $R'_i = R - R_i$
13: end for
14: Compute standard deviation $S$ of $\{R'_1, \ldots R'_n\}$
// *Calculate importance score*
15: for $i = 1 : n$ do
16:    $IS_i = R'_i / S$
17: end for

Fig. 3

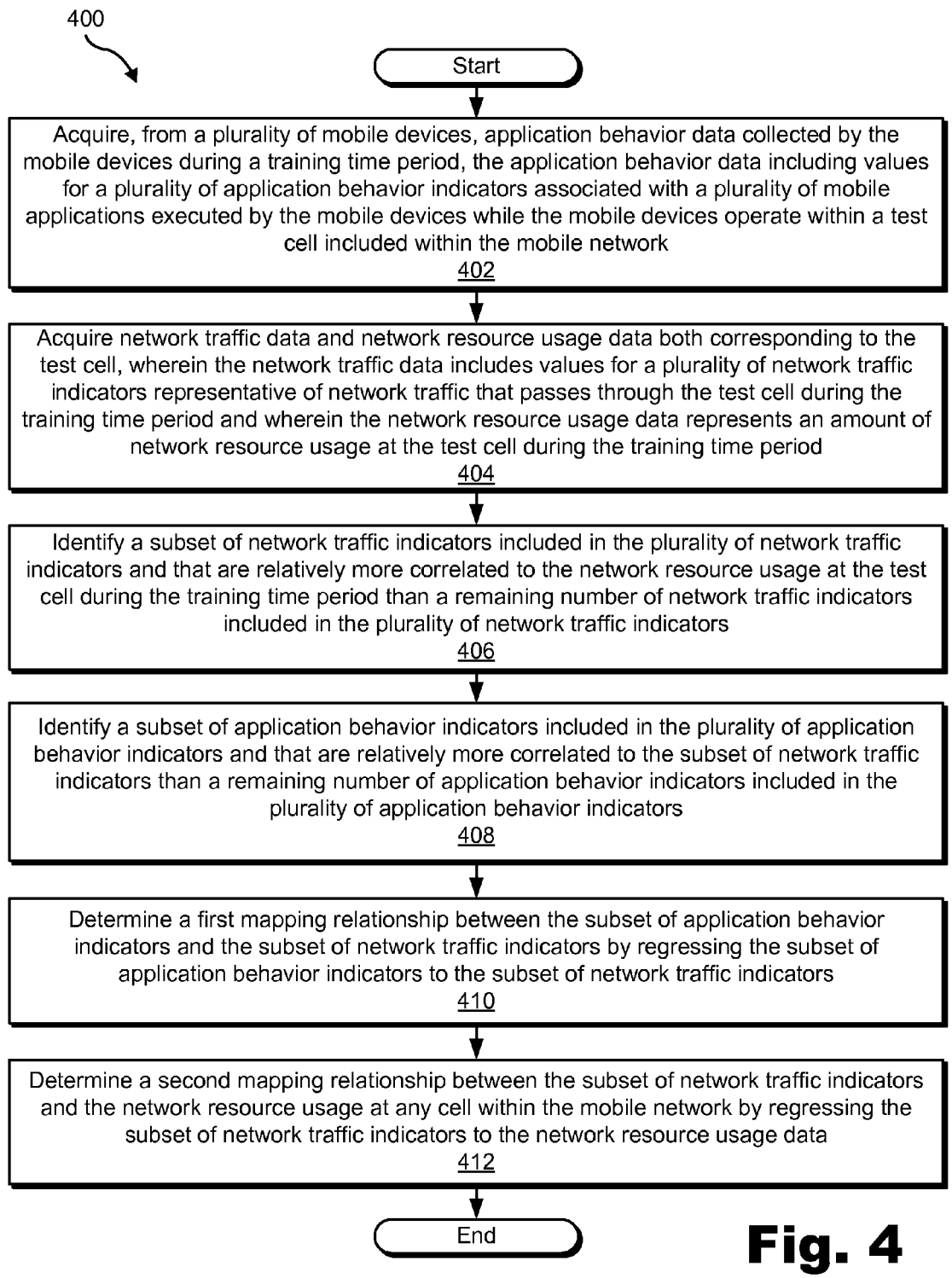

US 9,693,355 B2

METHODS AND SYSTEMS FOR PROFILING NETWORK RESOURCE USAGE BY A MOBILE APPLICATION

BACKGROUND INFORMATION

A plethora of mobile applications are available for use via smartphones and other mobile devices that operate on mobile networks. Many of these mobile applications, such as mobile applications that provide access to streaming video, social media content, and messaging services, generate a relatively large amount of network traffic.

To handle all of this network traffic, a mobile network must have sufficient network resources, such as power (e.g., transmitted power), central processing unit ("CPU") capabilities, and channel elements. If the amount of network traffic exceeds a mobile network's ability to handle the network traffic, mobile network outages or delays may occur.

As the popularity of mobile applications has grown, the need for mobile network providers to identify mobile applications that generate high volumes of network traffic and therefore consume a high amount of network resources has become more apparent. For example, if a provider of a mobile network could accurately profile or quantify how a particular mobile application consumes network resources, the provider could more effectively manage finite network resource allocation, make upgrades to the mobile network, optimize network resource utilization, and/or more fairly set usage pricing for use of the mobile network.

Unfortunately, unlike mobile device-side resources that are directly and solely impacted by function calls of mobile applications, network resources are only indirectly influenced by mobile applications. Rather, network resources are directly influenced by hundreds of mobile network conditions or indicators, such as traffic volumes, signaling intensity, etc. Moreover, even if mobile network providers could focus exclusively on mobile applications, it would still be difficult to clearly separate the network resource usage of one mobile application from another due to the huge number of coexisting mobile applications and their simultaneous impact on the mobile network. Finally, a particular mobile application is used at different times of day and at different locations with different network conditions. Thus, the mobile application's behavior, network traffic characteristics, and ultimately, its network resource usage, may vary frequently. Such ambiguity, complexity, and dynamicity together have heretofore made it extremely difficult or impossible for mobile network providers to quantify or even relatively rank mobile applications with respect to network resource usage.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 shows a high level code structure according to principles described herein.

FIG. 4 illustrates an exemplary method of building a two-layer mapping model according to principles described herein.

DETAILED DESCRIPTION OF PREFERRED EMBODIMENTS

Figure 1:
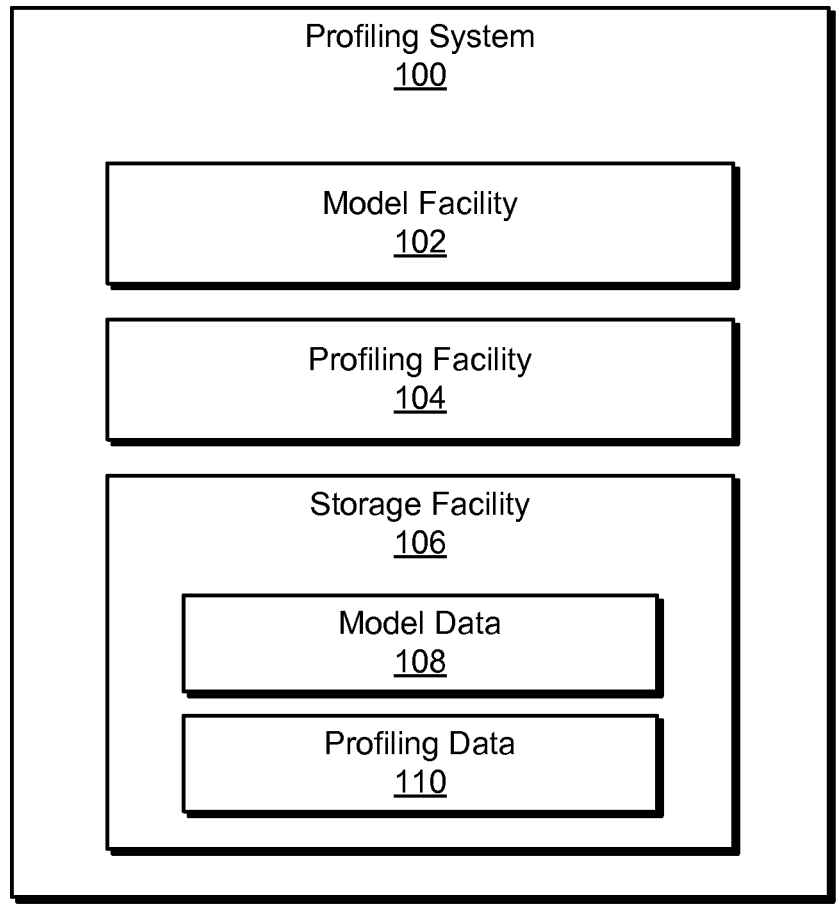
FIG. 1 illustrates an exemplary profiling system according to principles described herein.

Methods and systems for profiling network resource usage by a mobile application are described herein. For example, to facilitate profiling of network resource usage by specific mobile applications, a profiling system may build a two-layer mapping model for a mobile network. As will be described below, the two-layer mapping model establishes a causal relationship between a plurality of application behavior indicators and network resource usage within the mobile network by defining a first mapping relationship between the plurality of application behavior indicators and a plurality of network performance indicators representative of network traffic that passes through the mobile network, and a second mapping relationship between the plurality of network performance indicators and network resource usage within the mobile network.

The two-layer mapping model built by the profiling system may be used to profile network resource usage by individual mobile applications executed by mobile devices operating on the mobile network. For example, as will be described below, the profiling system may acquire application behavior data specific to a particular mobile application executed by one or more mobile devices while the one or more mobile devices operate on the mobile network and apply the application behavior data to the two-layer mapping model in order to profile network resource usage by the particular mobile application.

As used herein, an "application behavior indicator" refers to a measurable characteristic associated with how a mobile application behaves or operates. For example, an application behavior indicator may include any indicator representative of an on/off state of the mobile application, heart beats generated by the mobile application, hand-over rates associated with the mobile application, a size and/or frequency of messages transmitted and/or received by the mobile application, an amount of data transmitted and/or received by the mobile application, a number of registered users associated with the mobile application, a number of active users currently using the mobile application at any given time, a number of bytes per packet call made by the mobile application, etc. It will be recognized that there may be many more application behavior indicators than those listed herein.

As used herein, a "network traffic indicator" is representative of network traffic and signaling that passes through a mobile network (e.g., through a particular cell included in the mobile network). For example, a network traffic indicator may include one or more user plane indicators (e.g., DL.Cell.Simultaneous.Users.Average, DL.Cell.PRB.Used.Average, DL.Cell.PDCP.Throughput, and Cell.RRC.Connected.Users.Average), one or more signaling plane indicators (e.g., Cell.RRC.Connection.Req, Cell.PDCCH.OFDM.Symbol.Number, Cell.Paging.UUInterface.Number, and Cell.PDCCH.OFDM.CCE.Number), one or more mobility indicators (e.g., Cell.Intra+IntereNB.Handover.In and Cell.Intra+IntereNB.Handover.Out), one or more network performance indicators, etc.

As used herein, a "network resource" within a mobile network may include any resource used by the mobile network to handle network traffic that passes through the mobile network. For example, network resources within a mobile network may include, but are not limited to, transmitted power (e.g., Downlink Cell Transmitted Power), CPU capabilities, and channel elements.

The methods and systems described herein may facilitate accurate, effective, and efficient profiling of network resource usage by individual mobile applications. This, in turn, may allow mobile network providers to more effectively manage network resources and thereby ensure that their mobile networks are able to handle network traffic generated by the mobile applications.

FIG. 1 illustrates an exemplary profiling system 100 ("system 100") configured to facilitate profiling of network resource usage by mobile applications. As shown, system 100 may include, without limitation, a model facility 102, a profiling facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. Additionally or alternatively, one or more of the facilities 102-106 may be omitted from and external to system 100 in other implementations. For example, storage facility 106 may be external of and communicatively coupled to system 100 in certain alternative implementations. Facilities 102-106 of system 100 may include or be otherwise implemented by one or more computing devices specifically configured to perform one or more of the operations described herein. In such implementations, system 100 may be referred to as a computer-implemented system 100.

Storage facility 106 may store model data 108 representative of or associated with a two-layer mapping model built by model facility 102 and profiling data 110 used and/or generated by profiling facility 104. Storage facility 106 may store additional or alternative data as may serve a particular implementation. Data stored by storage facility 106 may be accessed by system 100 from any suitable source, including a source internal or external to system 100.

Model facility 102 may train and build a two-layer mapping model (or simply "mapping model") for use in profiling network resource usage by a mobile application executed by one or more mobile devices that operate on a mobile network. The mapping model may be built in any suitable manner.

For example, model facility 102 may build the mapping model by acquiring and processing various types of data during a training time period. The training time period may be any suitable length of time (e.g., a few days or a few months) that allows model facility 102 to acquire enough data to make the mapping model robust and complete. During the training time period, model facility 102 may acquire application behavior data collected by a plurality of mobile devices while the mobile devices operate within a particular cell (referred to herein as a "test cell") included within the mobile network and that has been reserved for exclusive use by the mobile devices, network traffic data representative of network traffic that passes through the test cell during the training time period, and network resource usage data representative of an amount of network resource usage at the test cell during the training time period. Each of these types of data, as well as how the data is processed by model facility 102, will be described in more detail below.

Figure 2:
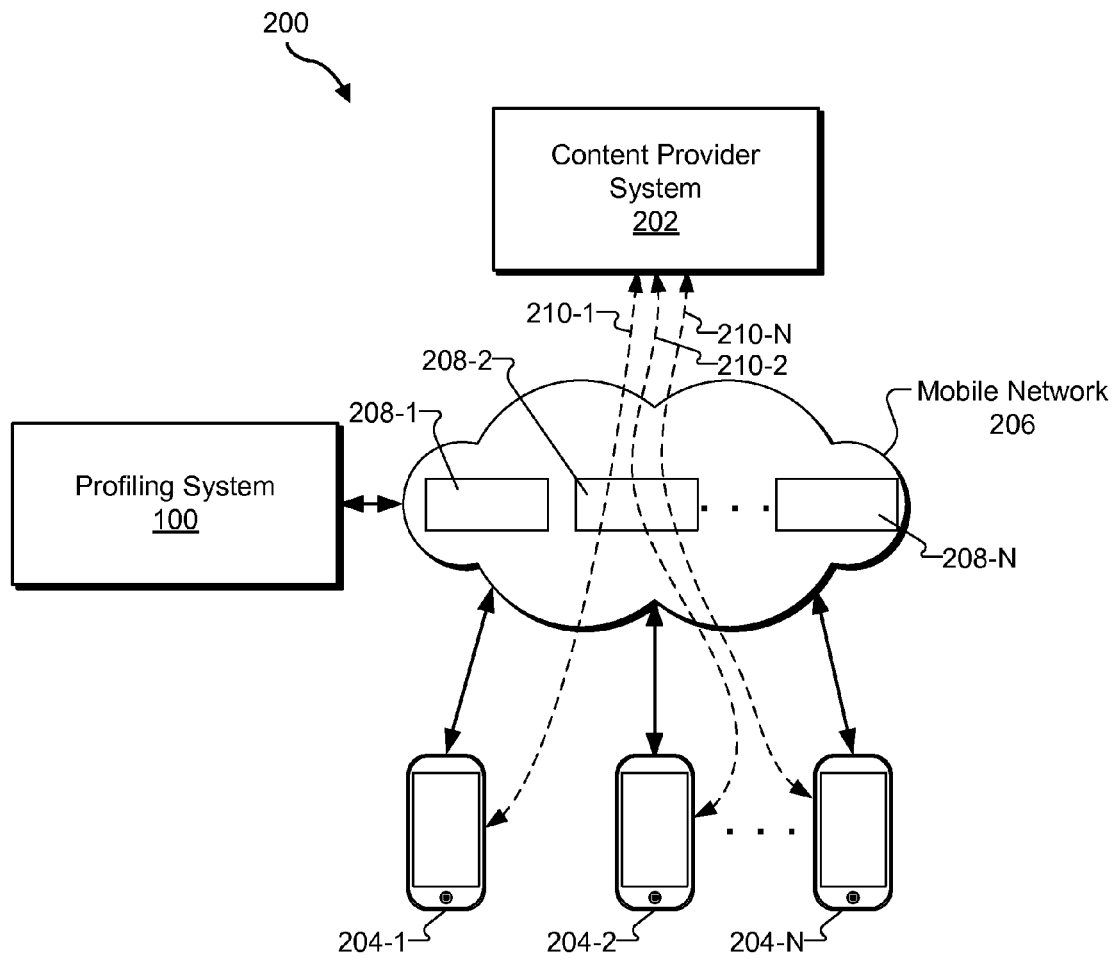
FIG. 2 shows an exemplary configuration within which a model facility may build a mapping model according to principles described herein.

FIG. 2 shows an exemplary configuration 200 within which model facility 102 may build the mapping model by acquiring and processing various types of data during a training time period. As shown, configuration 200 may include profiling system 100, a content provider system 202, and a plurality of mobile devices 204 (e.g., mobile devices 204-1 through 204-N) configured to communicate by way of a mobile network 206. As shown, mobile network 206 may include a plurality of cells 208 (e.g., cells 208-1 through 208-N) through which network traffic (e.g., network traffic generated and/or received by mobile applications being executed by mobile devices 204) may flow.

Mobile network 206 may include a wireless network provided and/or managed by a mobile carrier. For example, mobile network 206 may include a 4G LTE network, a 3G network, a 2G network, and/or any other type of wireless network as may serve a particular implementation.

Profiling system 100, content provider 202, and mobile devices 204 may communicate by way of mobile network 206 (and/or any other type of network) using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

Profiling system 100 may be implemented by one or more physical computing devices (e.g., one or more servers, data centers, etc.) located remotely from mobile devices 204. Profiling system 100 may be associated with (e.g., maintained and/or managed by) a provider of mobile device services (e.g., a mobile carrier). Profiling system 100 may alternatively be associated with any other entity as may serve a particular implementation.

Content provider system 202 may be configured to provide content (e.g., application content) and/or services to mobile devices 204 for access by users of mobile devices 204. For example, content provider system 202 may provide streaming video, social media content, messaging content, and/or other types of content to mobile devices 204 for access by users of mobile devices 204. In some examples, content provider system 202 may provide one or more mobile applications that may be installed on mobile devices 204 and used to access the content provided by content provider system 202. For example, content provider system 202 may provide a streaming video application, a social media application, a messaging application, and/or any other type of mobile application that may be installed on and executed by mobile devices 204.

Mobile devices 204 may include any suitable mobile computing devices configured to operate on mobile network 206 and execute one or more mobile applications. For example, mobile devices 204 may each include a smartphone, a tablet computer, a laptop computer, and/or any other type of mobile computing device as may serve a particular implementation. In this example, mobile devices 204 include only mobile devices selected to participate in the mapping model building process. For example, as will be described below, mobile devices 204 may include only mobile devices that have a data collection application installed thereon and that is configured to collect, during the training time period, application behavior data associated with mobile applications being executed by the mobile devices 204. Other mobile devices not selected to participate in the mapping model building process may also communicate by way of mobile network 206 (e.g., by way of one or more cells other than the test cell) during the training time period as may serve a particular implementation.

To build the mapping model, model facility 102 may acquire application behavior data collected by mobile devices 204 during a training time period. The application behavior data may include values for a plurality of application behavior indicators associated with a plurality of mobile applications executed by mobile devices 204 while mobile devices 204 operate within a test cell (e.g., test cell 208-2) included within mobile network 206.

Model facility 102 may acquire the application behavior data collected by mobile devices 204 in any suitable manner. For example, model facility 102 may provide a data collection application (e.g., a crowdsourcing tool) that may be installed and executed by mobile devices 204 during the training time period. The data collection tool may be configured, for example, to run silently in the background of each mobile device 204 and collect (e.g., record) application behavior indicators associated with each mobile application that is executed by mobile devices 204 during the training time period.

As an example, a user (e.g., a person who subscribes to a mobile data service provided by way of mobile network 206 and who has agreed to participate in the mapping model building process) of mobile device 204-1 may interact with a social media application (e.g., TWITTER) being executed by mobile device 204-1. While the user interacts with the social media application, the data collection application running in the background of mobile device 204-1 may collect application behavior data associated with the social media application. The data collection application may also collect application behavior data associated with the social media application even when the user is not actively interacting with the social media application (e.g., while the social media application runs in the background). The data collection application may likewise collect application behavior data associated with any other mobile application that is executed by mobile device 204-1 and the other mobile devices 204 during the training time period.

The application behavior data collected by the data collection application installed on each mobile device 204 may include values for any number (e.g., hundreds or thousands) of application behavior indicators associated with the mobile applications being executed by mobile devices 204. As mentioned, the application behavior indicators may include any indicator representative of an on/off state of the mobile application, heart beats generated by the mobile application, hand-over rates associated with the mobile application, a size and/or frequency of messages transmitted and/or received by the mobile application, an amount of data transmitted and/or received by the mobile application, a number of registered users associated with the mobile application, a number of active users currently using the mobile application at any given time, a number of bytes per packet call made by the mobile application, etc.

In some examples, the data collection applications may only collect application behavior data while mobile devices 204 operate within a test cell (which, in the example of FIG. 2, is cell 208-2) included in the mobile network. In other words, the data collection applications may only collect application behavior data while mobile devices 204 generate and/or receive network traffic that passes through test cell 208-2. Furthermore, model facility 102 may reserve, during the training time period, test cell 208-2 for network traffic generated and/or received by mobile devices 204. In this manner, model facility 102 may prevent network traffic generated by mobile devices not included in mobile devices 204 from passing through test cell 208-2 during the training time period and thereby prevent traffic leakage to other non-test cells. Hence, the network traffic data acquired by model facility 102 may correspond to network traffic generated and/or received by only mobile devices 204 (and not any other mobile device).

Model facility 102 may acquire the collected application behavior data from mobile devices 204 in any suitable manner. For example, model facility 102 may receive (e.g., periodically, in real-time as the application behavior data is collected, or at the conclusion of the training time period) the collected application behavior data from mobile devices 204 by way of mobile network 206 and/or by way of any other suitable network as may serve a particular implementation.

Model facility 102 may also acquire network traffic data that includes values for a plurality of network traffic indicators representative of network traffic that passes through the test cell 208-2 during the training time period. As shown, the network traffic that passes through the test cell 208-2 during the training time period may include network traffic 210-1 that flows between mobile device 204-1 and content provider system 202 while mobile device 204-1 is executing one or more mobile applications, network traffic 210-2 that flows between mobile device 204-2 and content provider system 202 while mobile device 204-2 is executing one or more mobile applications, and network traffic 210-N that flows between mobile device 204-N and content provider system 202 while mobile device 204-N is executing one or more mobile applications.

The network traffic data acquired by model facility 102 may include values for any number (e.g., hundreds or thousands) of network traffic indicators as may serve a particular implementation. As mentioned, the network traffic indicators may include one or more user plane indicators, one or more signaling plane indicators, one or more mobility indicators, one or more network performance indicators, etc.

Model facility 102 may acquire the network traffic data in any suitable manner. For example, model facility 102 may acquire the network traffic data by directly measuring or recording the network traffic data using any cell-level or mobile network-level tool as may serve a particular implementation.

Model facility 102 may also acquire network resource usage data that represents an amount of network resource usage at the test cell 208-2 during the training time period. Model facility 102 may acquire the network resource usage data in any suitable manner. For example, model facility 102 may measure the network resource usage data directly and/or receive the network resource usage data from one or more other measuring devices. To illustrate, model facility 102 may receive data representative of an amount of downlink cell transmitted power from one or more measuring devices located at test cell 208-2.

Because test cell 208-2 has been reserved for network traffic generated and/or received by mobile devices 204, the network traffic data and network resource usage data acquired by model facility 102 completely reflects the activity of the mobile applications executed by mobile devices 204 while mobile devices 204 operate within test cell 208-2.

Once the application behavior data, the network traffic data, and the network resource usage data are acquired, model facility 102 may identify a subset of network traffic indicators included in the plurality of network traffic indicators represented by the network traffic data and that are relatively more correlated to the network resource usage at the test cell 208-2 during the training time period than a remaining number of network traffic indicators included in the plurality of network traffic indicators. Likewise, model facility 102 may identify a subset of application behavior indicators included in the plurality of application behavior indicators represented by the application behavior data and that are relatively more correlated to the subset of network traffic indicators than a remaining number of application behavior indicators included in the plurality of application behavior indicators. By so doing, the most relevant (i.e., influential) application behavior indicators with respect to network resource usage may be identified and used to profile network resource usage for a particular mobile application.

Model facility 102 may identify the subset of network traffic indicators that are more correlated to the network resource usage at the test cell 208-2 during the training time period than the remaining number of network traffic indicators included in the plurality of network traffic indicators in any suitable manner. For example, model facility 102 may generate a set of importance scores for the plurality of network traffic indicators. The importance scores indicate a degree of correlation of each network traffic indicator included in the plurality of network traffic indicators to the acquired network resource usage data. Based on the set of importance scores, model facility 102 may select various network traffic indicators included in the plurality of identified network traffic indicators for inclusion in the subset of network traffic indicators. As used herein, network traffic indicators selected for inclusion in the subset of network traffic indicators will be referred to as the "most relevant" (i.e., most influential with respect to network resource usage) network traffic indicators.

Model facility 102 may generate the importance scores and thereby select the most relevant network traffic indicators in any suitable manner. For example, model facility 102 may generate the importance scores and thereby select the most relevant network traffic indicators in accordance with a proximity matrix-assisted feature selection ("PMFS") heuristic. In some examples, the PMFS heuristic used herein leverages Random-Forest decision to score the importance of each indicator (e.g., each network traffic indicator) according to its similarity distance.

An exemplary PMFS heuristic will now be described. The following description refers generally to "indicators". The "indicators" may refer to network traffic indicators when the PMFS heuristic is used to select the most relevant network traffic indicators. Alternatively, as will be described below, the PMFS heuristic may be applied to the application behavior data in order to select application behavior indicators that are most relevant to (i.e., that have the most influence on) the most relevant network traffic indicators. Hence, "indicators" as used below may alternatively refer to application behavior indicators.

After data collection (e.g., after the application behavior data, the network traffic data, and the network resource usage data are acquired), based on domain knowledge, each indicator of each record is given a label according to its measured value. After labeling, the PMFS heuristic applies a Random Forest classifier to build decision trees to the data and classify the data into different classes. While building the trees, the PMFS heuristic forms a two-dimensional similarity matrix, named "Proximity Matrix", where each entry records the similarity distance between each pair of indicators. The PMFS heuristic uses the Proximity Matrix to measure the similarity between clusters, and applies such knowledge to score the capability of each indicator in separating data into different classes. The PMFS heuristic only selects indicators with high importance scores as most relevant indicators.

More specifically, the Proximity Matrix is developed and updated during the growth of the decision trees in Random Forest. Given a training dataset with n indicators, initially, the Proximity Matrix P is an n-by-n matrix with all zeros. When the trees grow, the PMFS heuristic examines each node of the trees as follows. At a tree node, if a pair of indicators, $f_i$ and $f_j$, both appear in this node, then the PMFS heuristic updates the matrix entry $P_{ij}$ by adding 1 (i.e., $P_{ij}=P_{ij}+1$). This examination process is repeated until all the decision trees are fully grown in the forest. After that, the PMFS heuristic normalizes the value in each entry of the matrix and obtains the developed Proximity Matrix, in which each entry represents the similarity of the corresponding pair of indicators.

With the Proximity Matrix, the PMFS heuristic computes the importance score for each indicator. Assume that a training dataset has n indicators, and is classified into c classes. The PMFS heuristic computes the ratio of intra-class similarity, $P_{intra}$, and inter-class similarity, $P_{inter}$, as:

$$R = \frac{P_{intra}}{P_{inter}}, \text{ where } P_{intra} = \sum_{i,j=1}^{n} P_{i,j}, \text{ (if } i = j)$$

and $$P_{inter} = \sum_{i,j=1}^{n} P_{i,j}, \text{ (if } i \neq j).$$

Then, for each indicator $f_i$, to determine its importance, the PMFS heuristic replaces its value with random noise and obtain a new dataset. The PMFS heuristic feeds the new dataset to the Random Forest classifier and obtains a new Proximity Matrix $P_i$ along with its corresponding similarity ratio $R_i$. The PMFS heuristic computes the difference between the new ratio and the original one, $R'_i=R-R_i$. The PMFS heuristic applies this process for all the indicators and obtains the difference of similarity ratio for each of them. Finally, the PMFS heuristic calculates the importance score $IS_i$ for each indicator $f_i$ by normalizing its difference of similarity ratio as $IS_i=R'_i/S$, where S is the standard deviation of the difference of all the indicators $\{R'_1, \ldots, R'_n\}$.

The higher an indicator's importance score is, the more important and relevant the indicator is to the classifier. Therefore, the PMFS heuristic can select indicators with high importance scores considering they can be used for indicating the change of the data (e.g., the change of network resource usage). FIG. 3 shows a high level code structure 300 that may be used to direct one or more computing devices to implement the PMFS heuristic described herein. It will be recognized that the code structure 300 is exemplary of the many different ways the PMFS heuristic may be implemented and that each of the steps shown in code structure 300 may be implemented by specific computer-readable code in any suitable manner.

In some examples, model facility 102 may select a network traffic indicator for inclusion in the subset of network traffic indicators designated as being most relevant if the particular network traffic indicator has an importance score above a predetermined threshold. The predetermined threshold may be any suitable value as may serve a particular implementation and may be manually or automatically set. For example, the predetermined threshold may be 0.60. Table 1 shows a set of network traffic indicators that have importance scores greater than 0.60, and that may therefore be selected for inclusion in the subset of network traffic indicators designated as being most relevant.

TABLE 1

| Network Traffic Indicator | Importance Score |
| --- | --- |
| DL.Cell.PRB.Used.Average | 0.8735 |
| DL.Cell.Simultaneous.Users.Average | 0.8454 |
| DL.Cell.PDCP.Throughput | 0.8253 |
| Cell.RRC.Connected.Users.Average | 0.8192 |
| Cell.RRC.Connection.Req | 0.7960 |
| Cell.eRAB.Setup.Req | 0.7807 |
| Cell.Paging.UUInterface.Number | 0.7402 |
| Cell.PDCCH.OFDM.Symbol.Number | 0.7396 |
| Cell.PDCCH.OFDM.CCE.Number | 0.7308 |
| Cell.Intra + IntereNB.Handover.Out | 0.6377 |
| Cell.Intra + IntereNB.Handover.In | 0.6169 |

Additionally or alternatively, model facility 102 may select a predetermined number of network traffic indicators for inclusion in the subset of network traffic indicators designated as being most relevant. For example, model facility 102 may select network traffic indicators that have the ten highest importance scores for inclusion in the subset of network traffic indicators designated as being most relevant.

Once the most relevant network traffic indicators have been identified, model facility 102 may identify a subset of application behavior indicators included in the plurality of application behavior indicators and that are relatively more correlated to the most relevant network traffic indicators than a remaining number of application behavior indicators included in the plurality of application behavior indicators. This may be performed in any suitable manner.

For example, model facility 102 may generate a set of importance scores for the plurality of application behavior indicators. The importance scores indicate a degree of correlation of each application behavior indicator included in the plurality of application behavior indicators to the subset of network traffic indicators identified as being most relevant to the network resource usage data. Based on the set of importance scores, model facility 102 may select various application behavior indicators included in the plurality of identified application behavior indicators for inclusion in the subset of application behavior indicators. As used herein, application behavior indicators selected for inclusion in the subset of application behavior indicators will be referred to as the "most relevant" (i.e., most influential or most statistically significant) application behavior indicators with respect to the subset of network traffic indicators.

Model facility 102 may generate the importance scores for the application behavior indicators and thereby select the most relevant application behavior indicators in any suitable manner. For example, model facility 102 may generate the importance scores and thereby select the most relevant application behavior indicators in accordance with the same PMFS heuristic described above.

In some examples, model facility 102 may select an application behavior indicator for inclusion in the subset of application behavior indicators designated as being most relevant if the particular application behavior indicator has an importance score above a predetermined threshold. The predetermined threshold may be any suitable value as may serve a particular implementation and may be manually or automatically set. For example, the predetermined threshold may be 0.63. Table 2 shows a set of application behavior indicators that have importance scores greater than 0.63, and that may therefore be selected for inclusion in the subset of application behavior indicators designated as being most relevant to the network traffic indicators listed in Table 1.

TABLE 2

| Application Behavior Indicator | Importance Score |
| --- | --- |
| DL.TrafficVolumn.Bytes.PerApp | 0.8690 |
| DL.MeanHoldingTime.PerSession.PerApp | 0.8529 |
| Sessions.PerUser.PerApp | 0.8181 |
| ActiveSessions.PerApp | 0.8116 |
| Registered.Users.PerApp | 0.8012 |
| DL.ActiveUsers.PerApp | 0.7921 |
| Throughput.PerSession.PerApp | 0.7408 |
| DL.PacketCall.Frequency.PerApp | 0.7134 |
| UL.ActiveUsers.PerApp | 0.7103 |
| DL.Bytes.PerPacketCall.PerApp | 0.6945 |
| DL.Packets.PerPacketCall.PerApp | 0.6733 |
| PacketFreq.PerPacketCall.PerApp | 0.6402 |
| DL.PacketCalls.PerSession.PerApp | 0.6307 |

Additionally or alternatively, model facility 102 may select a predetermined number of application behavior indicators for inclusion in the subset of application behavior indicators designated as being most relevant. For example, model facility 102 may select application behavior indicators that have the ten highest importance scores for inclusion in the subset of application behavior indicators designated as being most relevant.

Once the most relevant network traffic indicators and application behavior indicators have been identified, model facility 102 may determine a causal relationship between the most relevant application behavior indicators and network resource usage at any cell 208 within mobile network 206. The causal relationship may be determined by determining a first mapping relationship between the most relevant application behavior indicators and the most relevant network traffic indicators, and a second mapping relationship between the most relevant network traffic indicators and network resource usage at any cell 208 within mobile network 206. The first and second mapping relationships may be merged to determine the causal relationship between the most relevant application behavior indicators and network resource usage at any cell 208 within mobile network 206.

In some examples, model facility 102 may determine the first mapping relationship between the most relevant application behavior indicators and the most relevant network traffic indicators by regressing the most relevant application behavior indicators to the most relevant network traffic indicators. Likewise, model facility 102 may determine the second mapping relationship between the most relevant network traffic indicators and network resource usage at any cell 208 within mobile network 206 by regressing the most relevant network traffic indicators to the acquired network resource usage data. Both instances of regression may be performed in accordance with a sliding-window-based local weight scatterplot smoothing ("SW-LOESS") heuristic. The SW-LOESS heuristic improves conventional LOESS heuristics by adaptively computing a proper window size during the regression, instead of using a fixed window as is done in conventional LOESS heuristics. An exemplary SW-LOESS heuristic will now be described.

In some examples, the SW-LOESS heuristic treats the identified indicators as features, packs the value of each feature into different bins, and dynamically adjusts a window size for each local set based on the distribution of each bin. After bin configuration, given a feature with n points and k bins, each with equal length L=n/k, the SW-LOESS heuristic sets an initial window size to n/100, and plots the scatterplot for all its measured values in an ascending order. Let f(x), (x=1, . . . , n) denote the scatterplot function. First, for each bin $bin_j$, the SW-LOESS heuristic computes its distribution density by integrating the value of the scatterplot function in its range as follows:

$$F_j = \int_{f^{-1}(L*j)}^{f^{-1}(L*j+L)} f(x)dx, (j=0, \ldots, k-1)$$

The SW-LOESS heuristic then sorts $F=\{F_0, \ldots, F_{k-1}\}$ in ascending order. Let $B_{Fmin}$ represent the bin with minimum value in F, $B_{Fmed}$ represent the bin with median value, and $B_{Fmax}$ represent the bin with maximum value. The SW-LOESS heuristic then dynamically calculates the window size by sorting the results, as follows:

$$win_{size} = \begin{cases} \dfrac{0.5\left(1+\dfrac{1}{i}\right) \cdot B}{100} * N, & \text{if } B = 0, \ldots, i \\ \dfrac{1+(B-i)}{100} * N, & \text{if } B = i+1, i+2, \ldots, k \end{cases}$$

The SW-LOESS heuristic uses the dynamically calculated sliding window size to perform LOESS regression to the selected features in each of the two layers (i.e., for each of the first and second mapping relationships).

The regression performed by the SW-LOESS heuristic establishes a first mapping relationship between the most relevant application behavior indicators and the most relevant network traffic indicators. The regression performed by the SW-LOESS heuristic also establishes a second mapping relationship between the most relevant network traffic indicators and network resource usage at any cell 208 within mobile network 206. Because both mapping relationships have a common component (i.e., the most relevant traffic indicators), the mapping model defines a causal relationship between the most relevant application behavior indicators and network resource usage at any cell 208 within mobile network 206.

Returning to FIG. 1, profiling facility 104 may use the mapping model built by model facility 102 to profile network resource usage by a particular application being executed by one or more mobile devices operating on mobile network 206. For example, profiling facility 104 may acquire application behavior data specific to the particular mobile application executed by the one or more mobile devices while the one or more mobile devices operate on mobile network 206. The acquired application behavior data may include values for application behavior indicators that have been identified in the mapping model as being most relevant.

Profiling facility 104 may acquire the application behavior data specific to the particular mobile application in any suitable manner. For example, the application behavior data specific to the particular mobile application may be received from the one or more mobile devices (e.g., by way of mobile network 206 or any other network). Additionally or alternatively, profiling facility 104 may perform a deep packet inspection heuristic at one or more cells 208 within the mobile network 206 to collect the application behavior data. In some examples, the application behavior data specific to the particular mobile application is generated and acquired subsequent to the building of the mapping model (i.e., subsequent to the training time period). Alternatively, the application behavior data specific to the particular mobile application may be included in the application behavior data collected by the mobile devices 204 during the training time period.

Profiling facility 104 may profile network resource usage by the particular mobile application within the mobile network 206 by applying the application behavior data specific to the particular mobile application to the mapping model built by model facility 102. The application behavior data may be applied to the mapping model by inputting the application behavior data into the model and processing the mapping model in accordance with the mapping relationships defined by the mapping model. The output of the mapping model may include data representative of a predicted amount of network resource usage by the particular mobile application.

FIG. 4 illustrates an exemplary method 400 of building a two-layer mapping model for use in profiling network resource usage by a mobile application executed by one or more mobile devices that operate on a mobile network. While FIG. 4 illustrates exemplary steps according to one embodiment, other embodiments may omit, add to, reorder, and/or modify any of the steps shown in FIG. 4. One or more of the steps shown in FIG. 4 may be performed by system 100 and/or any implementation thereof.

In step 402, a profiling system acquires, from a plurality of mobile devices, application behavior data collected by the mobile devices during a training time period. As described herein, the application behavior data includes values for a plurality of application behavior indicators associated with a plurality of mobile applications executed by the mobile devices while the mobile devices operate within a test cell included within the mobile network. Step 402 may be performed in any of the ways described herein.

In step 404, the profiling system acquires network traffic data and network resource usage data both corresponding to the test cell. As described herein, the network traffic data includes values for a plurality of network traffic indicators representative of network traffic that passes through the test cell during the training time period and the network resource usage data represents an amount of network resource usage at the test cell during the training time period. Step 404 may be performed in any of the ways described herein.

In step 406, the profiling system identifies a subset of network traffic indicators included in the plurality of network traffic indicators and that are relatively more correlated to the network resource usage at the test cell during the training time period than a remaining number of network traffic indicators included in the plurality of network traffic indicators. Step 406 may be performed in any of the ways described herein.

In step 408, the profiling system identifies a subset of application behavior indicators included in the plurality of application behavior indicators and that are relatively more correlated to the subset of network traffic indicators than a remaining number of application behavior indicators included in the plurality of application behavior indicators. Step 408 may be performed in any of the ways described herein.

Once the subset of network traffic indicators and the subset of application behavior indicators have been identified, the profiling system may determine a causal relationship between the subset of application behavior indicators and network resource usage at any cell within the mobile network by performing steps 410 and 412. In particular, in step 410, the profiling system determines a first mapping relationship between the subset of application behavior indicators and the subset of network traffic indicators by regressing the subset of application behavior indicators to the subset of network traffic indicators. In step 412, the profiling system determines a second mapping relationship between the subset of network traffic indicators and the network resource usage at any cell within the mobile network by regressing the subset of network traffic indicators to the network resource usage data. Steps 410 and 412 may be performed in any of the ways described herein.

Figure 5:
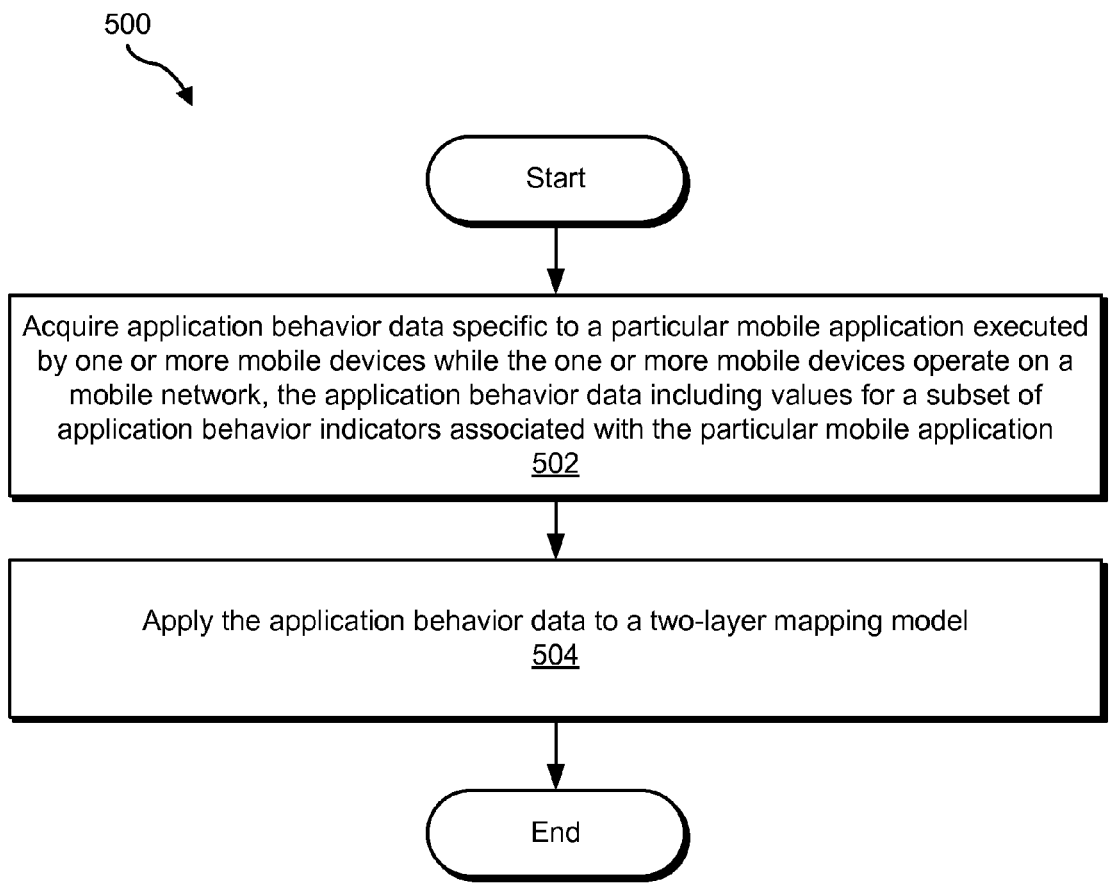
FIG. 5 illustrates an exemplary method of profiling network resource usage by a particular mobile application according to principles described herein.

FIG. 5 illustrates an exemplary method 500 of profiling network resource usage by a particular mobile application. While FIG. 5 illustrates exemplary steps according to one embodiment, other embodiments may omit, add to, reorder, and/or modify any of the steps shown in FIG. 5. One or more of the steps shown in FIG. 5 may be performed by system 100 and/or any implementation thereof.

In step 502, a profiling system acquires application behavior data specific to a particular mobile application executed by one or more mobile devices while the one or more mobile devices operate on a mobile network. As described herein, the application behavior data includes values for a subset of application behavior indicators associated with the particular mobile application. Step 502 may be performed in any of the ways described herein.

In step 504, the profiling system applies the application behavior data to a two-layer mapping model. As described herein, the two-layer mapping model defines a first mapping relationship between the plurality of application behavior indicators and a plurality of network performance indicators representative of network traffic that passes through the mobile network, and a second mapping relationship between the plurality of network performance indicators and network resource usage. In some examples, the two-layer mapping model is built by the profiling system prior to the profiling system acquiring the application behavior data. Alternatively, the two-layer mapping model may be built by a system other than the profiling system and provided to profiling system for use in profiling the network resource usage of the particular mobile application. Step 504 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
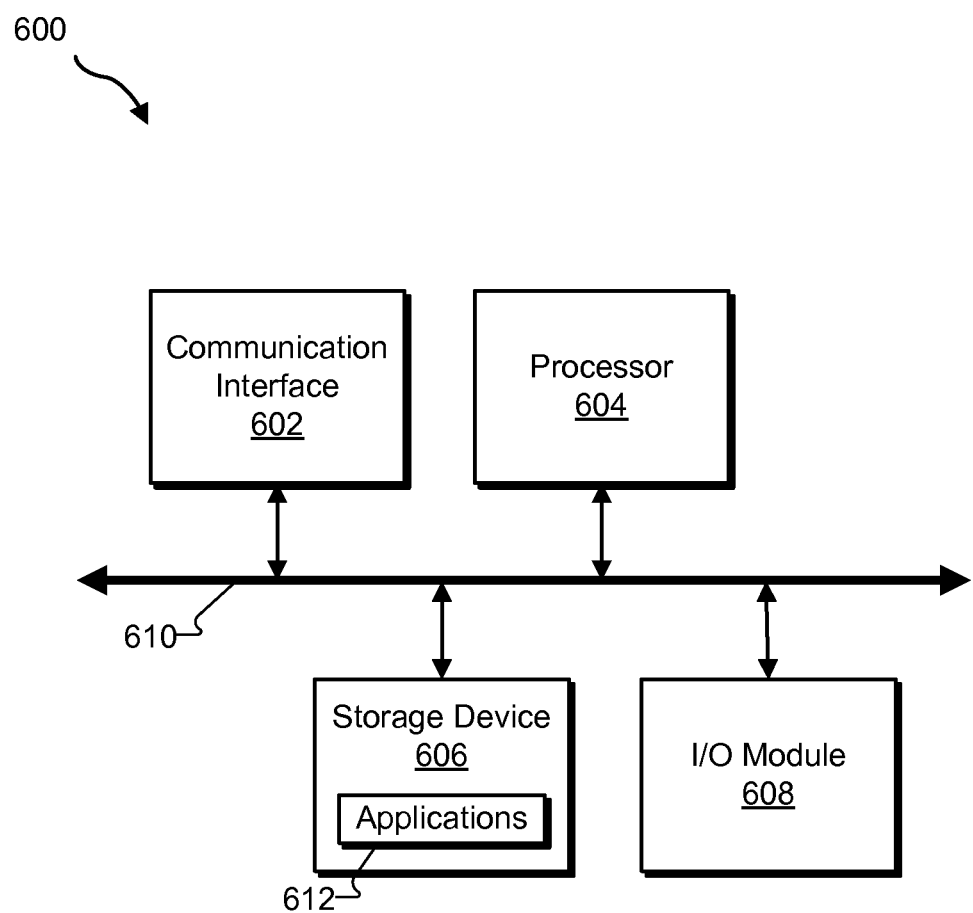
FIG. 6 illustrates an exemplary computing device according to principles described herein.

FIG. 6 illustrates an exemplary computing device 600 that may be specifically configured to perform one or more of the processes described herein. As shown in FIG. 6, computing device 600 may include a communication interface 602, a processor 604, a storage device 606, and an input/output ("I/O") module 608 communicatively connected via a communication infrastructure 610. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device.

For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may be configured to receive user input and provide user output and may include any hardware, firmware, software, or combination thereof supportive of input and output capabilities. For example, I/O module 608 may include hardware and/or software for capturing user input, including, but not limited to, a keyboard or keypad, a touch screen component (e.g., touch screen display), a receiver (e.g., an RF or infrared receiver), and/or one or more input buttons.

I/O module 608 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 600. For example, one or more applications 612 residing within storage device 606 may be configured to direct processor 604 to perform one or more processes or functions associated with model facility 102 and profiling facility 104. Likewise, storage facility 106 may be implemented by or within storage device 606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    building, by a profiling system, a two-layer mapping model for use in profiling network resource usage by a mobile application executed by one or more mobile devices that operate on a mobile network, the building comprising
        acquiring, from a plurality of mobile devices, application behavior data collected by the mobile devices during a training time period, the application behavior data including values for a plurality of application behavior indicators associated with a plurality of mobile applications executed by the mobile devices while the mobile devices operate within a test cell included within the mobile network;
        acquiring network traffic data and network resource usage data both corresponding to the test cell, wherein the network traffic data includes values for a plurality of network traffic indicators representative of network traffic that passes through the test cell during the training time period and wherein the network resource usage data represents an amount of network resource usage at the test cell during the training time period;
        identifying a subset of network traffic indicators included in the plurality of network traffic indicators and that are relatively more correlated to the network resource usage at the test cell during the training time period than a remaining number of network traffic indicators included in the plurality of network traffic indicators;
        identifying a subset of application behavior indicators included in the plurality of application behavior indicators and that are relatively more correlated to the subset of network traffic indicators than a remaining number of application behavior indicators included in the plurality of application behavior indicators; and
        determining a causal relationship between the subset of application behavior indicators and network resource usage at any cell within the mobile network by
            determining a first mapping relationship between the subset of application behavior indicators and the subset of network traffic indicators by regressing the subset of application behavior indicators to the subset of network traffic indicators, and
            determining a second mapping relationship between the subset of network traffic indicators and the network resource usage at any cell within the mobile network by regressing the subset of network traffic indicators to the network resource usage data; and
    using, by the profiling system and subsequent to the building of the two-layer mapping model, the two-layer mapping model to facilitate management of one or more mobile network resources by
        accessing application behavior data specific to a particular mobile application included in the plurality of mobile applications; and
        profiling network resource usage by the particular mobile application within the mobile network by applying the application behavior data specific to the particular mobile application to the two-layer mapping model.

2. The method of claim 1, wherein the identifying of the subset of network traffic indicators included in the plurality of network traffic indicators and that are relatively more correlated to the network resource usage at the test cell during the training time period than the remaining number of network traffic indicators included in the plurality of network traffic indicators comprises:
  generating a set of importance scores for the plurality of network traffic indicators, the set of importance scores indicating a degree of correlation of each network traffic indicator included in the plurality of network traffic indicators to the network resource usage data;
  selecting, based on the set of importance scores, various network traffic indicators included in the plurality of network traffic indicators for inclusion in the subset of network traffic indicators.

3. The method of claim 2, wherein the generating and selecting are performed in accordance with a proximity matrix-assisted feature selection heuristic.

4. The method of claim 2, wherein the selecting of the various network traffic indicators for inclusion in the subset of network traffic indicators comprises selecting a particular network traffic indicator included in the plurality of network traffic indicators for inclusion in the subset of network traffic indicators if the particular network traffic indicator has an importance score above a predetermined threshold.

5. The method of claim 2, wherein the selecting of the various network traffic indicators for inclusion in the subset of network traffic indicators comprises selecting, for inclusion in the subset of network traffic indicators, a predetermined number of network traffic indicators included in the plurality of network traffic indicators and that have higher importance scores than the remaining number of network traffic indicators.

6. The method of claim 1, wherein the identifying of the subset of application behavior indicators included in the plurality of application behavior indicators and that are relatively more correlated to the subset of network traffic indicators than the remaining number of application behavior indicators included in the plurality of application behavior indicators comprises:
  generating a set of importance scores for the plurality of application behavior indicators, the set of importance scores indicating a degree of correlation of each application behavior indicator included in the plurality of application behavior indicators to the subset of network traffic indicators;
  selecting, based on the set of importance scores, various application behavior indicators included in the plurality of application behavior indicators for inclusion in the subset application behavior indicators.

7. The method of claim 6, wherein the generating and selecting are performed in accordance with a proximity matrix-assisted feature selection heuristic.

8. The method of claim 6, wherein the selecting of the various application behavior indicators for inclusion in the subset of application behavior indicators comprises selecting a particular application behavior indicator included in the plurality of application behavior indicators for inclusion in the subset of application behavior indicators if the particular application behavior indicator has an importance score above a predetermined threshold.

9. The method of claim 6, wherein the selecting of the various application behavior indicators for inclusion in the subset of application behavior indicators comprises selecting, for inclusion in the subset of application behavior indicators, a predetermined number of application behavior indicators included in the plurality of application behavior indicators and that have higher importance scores than the remaining number of application behavior indicators.

10. The method of claim 1, wherein the regressing of the subset of application behavior indicators to the subset of network traffic indicators and the regressing of the subset of network traffic indicators to the network resource usage data are performed in accordance with a sliding-window-based local weight scatterplot smoothing heuristic.

11. The method of claim 1, embodied as computer-executable instructions on at least one non-transitory computer-readable medium.

12. A method comprising:
  acquiring, by a profiling system, application behavior data specific to a particular mobile application executed by one or more mobile devices while the one or more mobile devices operate on a mobile network, the application behavior data including values for a subset of application behavior indicators included in a plurality of application behavior indicators associated with the particular mobile application; and
  using, by the profiling system, a two-layer mapping model to facilitate management of one or more mobile network resources by
    accessing the application behavior data specific to the particular mobile application, and
    profiling network resource usage by the particular mobile application within the mobile network by applying the application behavior data to the two-layer mapping model,
  wherein the two-layer mapping model defines
    a first mapping relationship between the subset of application behavior indicators and a plurality of network performance indicators representative of network traffic that passes through the mobile network, and
    a second mapping relationship between the plurality of network performance indicators and network resource usage at any cell within the mobile network.

13. The method of claim 12, wherein the acquiring comprises receiving the application behavior data from the one or more mobile devices.

14. The method of claim 12, wherein the acquiring comprises performing a deep packet inspection heuristic at one or more cells within the mobile network to collect the application behavior data.

15. The method of claim 12, wherein the application behavior indicators are further associated with a plurality of mobile applications executed by a plurality of mobile devices while the mobile devices operate within a test cell included within the mobile network, and wherein the method further comprises building, by the profiling system prior to the profiling of the network resource usage, the two-layer mapping model by:
  acquiring, from the plurality of mobile devices, additional application behavior collected by the mobile devices during a training time period, the additional application behavior data including additional values for the plurality of application behavior indicators;
  acquiring network traffic data and network resource usage data both corresponding to the test cell, wherein the network traffic data includes values for a plurality of network traffic indicators representative of network traffic that passes through the test cell during the training time period and wherein the network resource usage data represents an amount of network resource usage at the test cell during the training time period;
  identifying a subset of network traffic indicators included in the plurality of network traffic indicators and that are relatively more correlated to the network resource usage at the test cell during the training time period than a remaining number of network traffic indicators included in the plurality of network traffic indicators;

identifying application behavior indicators included in the plurality of application behavior indicators and that are relatively more correlated to the subset of network traffic indicators than a remaining number of application behavior indicators included in the plurality of application behavior indicators;

designating the identified application behavior indicators as the subset of application behavior indicators; and determining a causal relationship between the subset of application behavior indicators and the network resource usage at any cell within the mobile network by determining a first mapping relationship between the subset of application behavior indicators and the subset of network traffic indicators by regressing the subset of application behavior indicators to the subset of network traffic indicators, and determining a second mapping relationship between the subset of network traffic indicators and the network resource usage at any cell within the mobile network by regressing the subset of network traffic indicators to the network resource usage data.

16. The method of claim 12, embodied as computer-executable instructions on at least one non-transitory computer-readable medium.

17. A system comprising:

at least one physical computing device that builds a two-layer mapping model for use in profiling network resource usage by a mobile application executed by one or more mobile devices that operate on a mobile network, wherein the at least one physical computing devices builds the two-layer mapping model by acquiring, from a plurality of mobile devices, application behavior data collected by the mobile devices during a training time period, the application behavior data including values for a plurality of application behavior indicators associated with a plurality of mobile applications executed by the mobile devices while the mobile devices operate within a test cell included within the mobile network;

acquiring network traffic data and network resource usage data both corresponding to the test cell, wherein the network traffic data includes values for a plurality of network traffic indicators representative of network traffic that passes through the test cell during the training time period and wherein the network resource usage data represents an amount of network resource usage at the test cell during the training time period;

identifying a subset of network traffic indicators included in the plurality of network traffic indicators and that are relatively more correlated to the network resource usage at the test cell during the training time period than a remaining number of network traffic indicators included in the plurality of network traffic indicators;

identifying a subset of application behavior indicators included in the plurality of application behavior indicators and that are relatively more correlated to the subset of network traffic indicators than a remaining number of application behavior indicators included in the plurality of application behavior indicators; and determining a causal relationship between the subset of application behavior indicators and network resource usage at any cell within the mobile network by determining a first mapping relationship between the subset of application behavior indicators and the subset of network traffic indicators by regressing the subset of application behavior indicators to the subset of network traffic indicators, and determining a second mapping relationship between the subset of network traffic indicators and the network resource usage at any cell within the mobile network by regressing the subset of network traffic indicators to the network resource usage data, wherein the at least one computing device further uses the built two-layer mapping model to facilitate management of one or more mobile network resources by accessing application behavior data specific to a particular mobile application included in the plurality of mobile applications, and profiling network resource usage by the particular mobile application within the mobile network by applying the application behavior data specific to the particular mobile application to the two-layer mapping model.

18. The system of claim 17, wherein the identifying of the subset of network traffic indicators included in the plurality of network traffic indicators and that are relatively more correlated to the network resource usage at the test cell during the training time period than the remaining number of network traffic indicators included in the plurality of network traffic indicators comprises:

generating a set of importance scores for the plurality of network traffic indicators, the set of importance scores indicating a degree of correlation of each network traffic indicator included in the plurality of network traffic indicators to the network resource usage data;

selecting, based on the set of importance scores, various network traffic indicators included in the plurality of network traffic indicators for inclusion in the subset of network traffic indicators.

19. The system of claim 17, wherein the identifying of the subset of application behavior indicators included in the plurality of application behavior indicators and that are relatively more correlated to the subset of network traffic indicators than the remaining number of application behavior indicators included in the plurality of application behavior indicators comprises:

generating a set of importance scores for the plurality of application behavior indicators, the set of importance scores indicating a degree of correlation of each application behavior indicator included in the plurality of application behavior indicators to the subset of network traffic indicators;

selecting, based on the set of importance scores, various application behavior indicators included in the plurality of application behavior indicators for inclusion in the subset application behavior indicators.

* * * * *